United States Patent [19]
Howell

[11] 3,888,038
[45] June 10, 1975

[54] FISHING HOOK REMOVER

[76] Inventor: Barbara J. Howell, 14226 Julie Dale, Humble, Tex. 77338

[22] Filed: Apr. 29, 1974

[21] Appl. No.: 465,232

[52] U.S. Cl. ............................................. 43/53.5
[51] Int. Cl. ........................................ A01k 97/00
[58] Field of Search ................................ 43/53.5

[56] References Cited
UNITED STATES PATENTS

| | | | |
|---|---|---|---|
| 2,215,275 | 9/1940 | Phillips | 43/53.5 |
| 2,931,125 | 4/1960 | Planin | 43/53.5 |
| 3,099,100 | 7/1963 | Wiseman | 43/53.5 |
| 3,706,154 | 12/1972 | Luebbers et al. | 43/53.5 |

Primary Examiner—Warner H. Camp
Attorney, Agent, or Firm—Washington Patent Assistance, Inc.

[57] ABSTRACT

A hook remover consisting of an elongated rod bent over onto itself at one end to form a hook with the opposite end affixed to a handle adapted to be gripped in an individual's hand. The handle may be hollow and may be provided with a cap providing access to the hollow compartment therein for storage of fishing articles therein such as hooks, sinkers, fishing lines, and the like. Further, the handle may be provided with a clip on the exterior surface thereof for ease in clipping the hook remover device to an individual's belt and the like.

1 Claim, 6 Drawing Figures

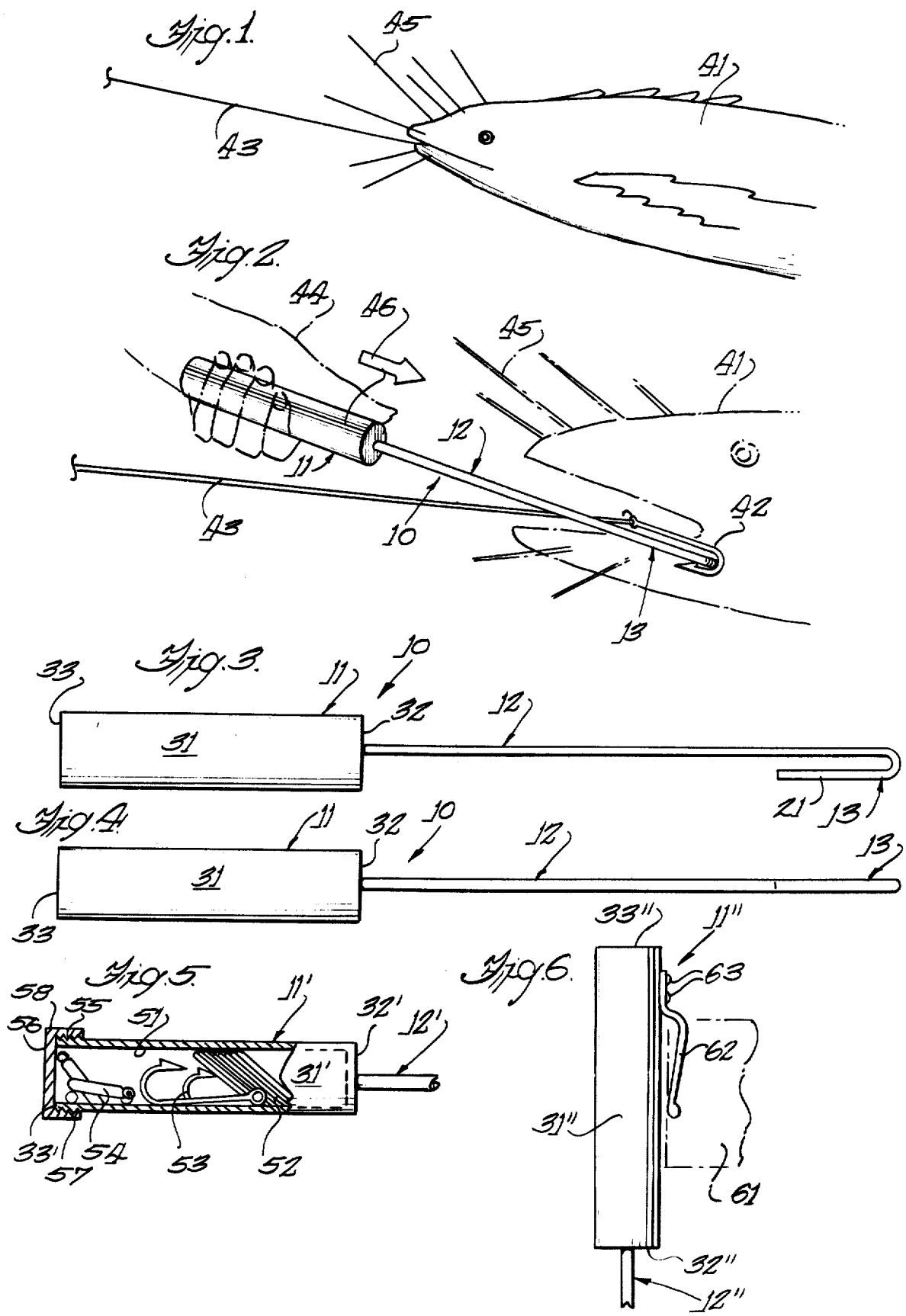

FISHING HOOK REMOVER

BACKGROUND OF THE INVENTION

1. Field of the Invention

This invention relates generally to fishing devices and more particularly to a novel and improved hook remover device adapted for use in the safe and rapid removal of a fish hook from a fish's mouth without requiring the fisherman to hold or otherwise engage the fish.

2. Description of the Prior Art

The sport of fishing is constantly increasing in popularity, and along with such increase is a demand for fishing accessories to enhance the enjoyment of the sport. In this regard, one of the greatest problems encountered by a fisherman is the need for removing the fish hook from the mouth of a caught fish in a manner avoiding injury or wounding of the fisherman from having to hold the fish during such process, along with avoiding injury to the fisherman from the fish hook itself due to a wiggling fish. This problem is quite noticeable in the fishing for Catfish wherein the hooks are unusually difficult to remove due to both the nature of these fish swallowing both the hook and the bait along with the problem of the fish having barbs on its fins tending to puncture and wound the fisherman's hand when attempting to hold the fish and remove the hook.

SUMMARY OF THE INVENTION

The present invention recognizes the difficulties encountered by a fisherman in the catching of a Catfish and having to remove the fishing hook from the fish's mouth, and provides a novel solution thereto in the form of a fish hook removal device adapted to be placed along the fish line and guided to a position near the hook embedded in the fish's mouth and then, by holding the fishing line close to the fish's mouth in one hand, the fisherman gives a forward flipping motion to the hook removal device effecting the removal of the hook and the fish dropping therefrom onto the ground.

It is a feature of the present invention to provide a fishing hook remover specifically adapted for the removal of a fishing hook from the mouth of a Catfish in a manner avoiding any contact with the body of the Catfish by the fisherman.

A further feature of the present invention provides a fish hook remover which is relatively simple in its construction and which therefore may be readily manufactured at a relatively low cost and by simple manufacturing methods.

Still a further feature of the present invention provides a fishing hook remover which is devoid of moving parts and which therefore is unlikely to get out of order.

Yet still a further feature of the present invention provides a fishing hook remover which is of a rugged and durable construction and which therefore may be guaranteed by the manufacturer to withstand rough usage.

Still yet a further feature of the present invention provides a fishing hook remover which is easy to use and reliable and efficient in operation.

Yet still a further feature of the present invention provides a fishing hook remover which can be retailed at a sufficiently low price to encourage its widespread use and acceptance among fishermen.

Other features and advantages of this invention will be apparent during the course of the following description.

BRIEF DESCRIPTION OF THE DRAWINGS

In the accompanying drawings forming a part of this specification, and in which like reference characters are employed to designate like parts throughout the same:

FIG. 1 is a perspective view of a Catfish having a fishing hook embedded in its mouth;

FIG. 2 is a perspective view of the fishing hook remover of the present invention illustrated in position to remove the hook from the mouth of the fish;

FIG. 3 is a top plan view of the fishing hook remover of the present invention;

FIG. 4 is a front elevational view of the fishing hook remover;

FIG. 5 is a fragmentary side elevational view of a modified form of the invention having the handle portion partially broken away to illustrate interior details thereof; and FIG. 6 is a fragmentary front elevational view of yet a further modified form of the handle of the invention.

DESCRIPTION OF THE PREFERRED EMBODIMENTS

Referring now to the drawings in detail there is illustrated a preferred form of a fishing hook remover device constructed in accordance with the principles of the present invention and designated generally in its entirety by the reference numeral 10 and which is comprised of two component parts, namely a handle 11 and a shank 12 having a hook 13 formed at one end thereof.

The shank 12 is manufactured of an elongated length of solid cylindrically shaped rod having a diameter of one-eighth inch. The shank is affixed at one end to the handle 11 and projects axially outwardly therefrom a distance of about 7 inches after which it is bent in a loop onto itself with the terminal section 21 being about 1 inch long and extending parallel to the shank 12 in a direction pointed back toward handle 11 and spaced a distance of ⅛ inch from the shank 12.

The handle 11 is of a cylindrical configuration measuring one inch in diameter and has side walls 31, a front end 32, and a back end 33, the length of the handle being 4 inches. The shank 12 is affixed to the front end 32 of the handle. The handle 11 may be manufactured out of metal, wood, hard rubber, plastic, or any other suitable satisfactory material, with the handle being either of a solid or hollow configuration.

Referring now specifically to FIGS. 1 and 2, it is seen that there is illustrated a Catfish 41 having a conventional barbed fishing hook 42 embedded in its mouth, the fishing hook being affixed to one end of a fishing line 43. To remove fishing hook 42 from the mouth of Catfish 41 without having to contact or otherwise hold the body of the fish or have the individual's hand 44 holding device 10 come close to the barbs 45 on the fish, an individual grips the fishing line 43 close to the fish's mouth but yet spaced from barbs 45, engages remover hook portion 13 with the fishing hook 42, and then by providing a forward and flipping movement in the direction of arrow 46 is able to release the hook from the fish's mouth such that the fish drops from the hook onto the ground. In this manner the fisherman is a safe distance out of contact with the sharp points of the barbs 45 such that the hook is easily removed from the mouth of the Catfish in a safe manner preventing any injury to the fisherman, this thus enhancing the enjoyment of the fisherman in catching Catfish.

Referring to FIG. 5 there is illustrated an alternative embodiment of the handle 11 which is generally designated by reference numeral 11' with 12' designating a shank portion which is identical to previously described shank 12. The handle 11' is of a hollow cylindrical configuration having a front end 32', an open back end 33', cylindrical side walls 31', and a compartment 51 which is accessible through the open back end 33'. The compartment 51 is of a size adapted to readily hold therein a multiplicity of fishing accessories such as fishing lines 52, fishing hooks 53, sinkers 54, and the like. The exterior circumference of side walls 31' are provided with screw threads 55 adjacent open end 33', with a cylindrically shaped cap 56 provided having complementary screw threads 57 disposed interiorly of depending side walls 58 from back surface 59 so as to be threadedly received on side walls 31' in a manner to seal compartment 51 in a watertight manner.

Referring now to FIG. 6 there is illustrated yet a further modified embodiment of a handle which is designated by reference numeral 11" with the shank portion being designated by reference numeral 12" and which is identical to previously described shank 12. The handle 11" is of a cylindrical configuration having side walls 31", a front end 32", and a back end 33". In this regard it is to be understood that the handle may be of a solid or hollow configuration, and furthermore may include a compartment in the handle in which case it would be identical to the construction of FIG. 5 except for the modification of the addition of a clip as will now be described. For use in supporting the fishing hook remover from a belt 61 or the like of a fisherman, there is provided on the handle 11" a spring type generally Z-shaped retaining hook 62 affixed to a portion of side wall 31" by rivets 63 and adapted to be fit over a portion of the belt 61 in the manner as illustrated so as to support the fishing hook remover suspended therefrom in a manner readily accessible to a fisherman.

It is to be understood that the form of this invention herewith shown and described is to be taken as preferred examples of the same, and that this invention is not to be limited to the exact arrangement of parts shown in the accompanying drawings or described in this specification as various changes in the details of construction as to shape, size, and arrangement of parts may be resorted to without departing from the spirit of the invention, the scope of the novel concepts thereof, or the scope of the sub-joined claims.

Having thus described the invention, what is claimed is:

1. A hook remover device intended for removing a fishing hook from the mouth of a fish in a manner avoiding any contact between the body of the fish and the body of the individual who caught the fish, the hook remover device comprising, in combination:

a handle member of an elongated hollow cylindrical configuration having cylindrical side walls, a flat front end, and an open back end;

a compartment of an elongated cylindrical configuration defined interiorly of said side walls and said closed front end with ingress and egress thereof being through said open back end;

a plurality of screw threads formed integrally with said housing side walls exterior thereof adjacent said open back end and extending about the circumference thereof;

a cylindrically shaped cap member having a closed back end surface, an open front end surface, and cylindrical side walls formed integrally with the peripheral edges of said back surface and depending outwardly therefrom;

screw threads disposed about the interior circumference of said cap side wall surfaces from said open front end thereof to said closed back end thereof;

said cap member adapted to be threadedly engaged with said threads on said body member to close said handle member compartment in a watertight manner;

said handle member having a diameter of 1 inch and an overall length of about 4 inches;

a generally Z-shaped retaining clip having one end portion thereof permanently affixed to said handle side wall with said clip extending longitudinally along a tangential line disposed along said side wall and spaced therefrom a distance adapted to resiliently engage at its opposite end onto an individual's belt, pants top, and the like for temporarily hanging said handle member in a suspended manner therefrom;

an elongated solid cylindrical rod disposed concentric with said front end of said handle member and having one end affixed thereto with the opposite end projecting outwardly therefrom, said rod being of an even continuous diameter throughout its entire length;

a hook member formed integrally with the projecting free end of said rod, said hook member being formed by bending said free end of said rod back onto itself to point in the direction of said handle member with the bight portion of said hook member projecting outwardly of said handle member;

said rod having a length of about 7 inches;

said bent over portion defining said hook member having a length of about 1 inch;

said bent over portion being spaced from said rod a distance of about ⅛ inch;

said bent over portion extending parallel to said rod; and said bent over portion being of the same cross-sectional diameter continuously therealong as said rod.

* * * * *